United States Patent
Buckley et al.

(10) Patent No.: US 8,744,015 B2
(45) Date of Patent: Jun. 3, 2014

(54) MESSAGE DECODING FOR DISCRETIZED SIGNAL TRANSMISSIONS

(75) Inventors: Michael Eoin Buckley, Grayslake, IL (US); Paul James Lusina, Vancouver (CA)

(73) Assignee: BlackBerry Limited, Waterloo, Ontario (CA)

( * ) Notice: Subject to any disclaimer, the term of this patent is extended or adjusted under 35 U.S.C. 154(b) by 437 days.

(21) Appl. No.: 12/794,589

(22) Filed: Jun. 4, 2010

(65) Prior Publication Data

US 2011/0299637 A1    Dec. 8, 2011

(51) Int. Cl.
H04L 27/06    (2006.01)

(52) U.S. Cl.
USPC .......................................... 375/340; 370/328

(58) Field of Classification Search
USPC .................... 375/340, 316, 211, 324; 370/328
See application file for complete search history.

(56) References Cited

U.S. PATENT DOCUMENTS

| | | | |
|---|---|---|---|
| 6,628,714 B1 | 9/2003 | Fimoff et al. | |
| 7,345,603 B1* | 3/2008 | Wood et al. | 341/122 |
| 7,707,241 B2 | 4/2010 | Bruekers | |
| 2002/0059642 A1* | 5/2002 | Russ et al. | 725/135 |
| 2004/0047318 A1 | 3/2004 | Matsumoto | |
| 2005/0147059 A1 | 7/2005 | Sun | |
| 2006/0078072 A1 | 4/2006 | Cheon et al. | |
| 2007/0027656 A1* | 2/2007 | Baraniuk et al. | 702/189 |
| 2007/0100606 A1 | 5/2007 | Rogers | |
| 2007/0160159 A1 | 7/2007 | Song et al. | |
| 2008/0129560 A1* | 6/2008 | Baraniuk et al. | 341/87 |
| 2009/0029519 A1 | 1/2009 | Lee | |
| 2009/0046569 A1 | 2/2009 | Chen et al. | |
| 2009/0100096 A1 | 4/2009 | Erlichson et al. | |
| 2009/0196513 A1* | 8/2009 | Tian et al. | 382/232 |
| 2009/0222226 A1* | 9/2009 | Baraniuk et al. | 702/66 |
| 2009/0316768 A1 | 12/2009 | Pietraski et al. | |
| 2010/0066493 A1* | 3/2010 | Rachlin | 340/5.82 |
| 2010/0182950 A1* | 7/2010 | Sexton et al. | 370/328 |
| 2010/0265799 A1* | 10/2010 | Cevher et al. | 367/121 |
| 2010/0290395 A1 | 11/2010 | Sexton et al. | |
| 2010/0302086 A1* | 12/2010 | Dudgeon et al. | 341/155 |
| 2010/0322327 A1* | 12/2010 | Caire et al. | 375/260 |
| 2011/0149791 A1* | 6/2011 | Wang et al. | 370/252 |
| 2011/0286507 A1* | 11/2011 | Yu et al. | 375/224 |

OTHER PUBLICATIONS

Thomas A.Sexton, Paul Lusina and Christopher A.DeVries, "Remote Sampler—Central Brain Architecture", Research in Motion, Jan. 10-14, 2010, IEEE.*

(Continued)

*Primary Examiner* — Aristocratis Fotakis
(74) *Attorney, Agent, or Firm* — Conley Rose, P.C.; J. Robert Brown, Jr.

(57) ABSTRACT

Methods, devices and systems for sensor-based wireless communication systems using compressive sampling are provided. In one embodiment, the method for sampling signals comprises receiving, over a wireless channel, a user equipment transmission based on an S-sparse combination of a set of vectors; down converting and discretizing the received transmission to create a discretized signal; correlating the discretized signal with a set of sense waveforms to create a set of samples, wherein a total number of samples in the set is equal to a total number of sense waveforms in the set, wherein the set of sense waveforms does not match the set of vectors, and wherein the total number of sense waveforms in the set of sense waveforms is fewer than a total number of vectors in the set of vectors; and transmitting at least one sample of the set of samples to a remote central processor.

20 Claims, 10 Drawing Sheets

(56) References Cited

OTHER PUBLICATIONS

V. Havary-Nassab, S. Hassan and S. Valaee, "Compressive detection for wide-band spectrum sensing", University of Toronto, Canada, Mar. 2010, IEEE.*

Ying Wang, Geert Leus and Ashish Pandharipande, "Direction estimation using compressive sampling array processing", Philips Research Europe, Delft University of Technology, Netherlands, Sep. 2009, IEEE.*

Zhenghao Zhang, Husheng Li, Depeng Yang and Changxing Pei, "Space-time Bayesian Compressed Spectrum Sensing for Wideband Cognitive Radio Networks", Xidian University and University of Tennessee, Apr. 2010, IEEE.*

Zhi Tian and Georgios B.Giannakis, "Compressed Sensing for Wideband Cognitive Radios", Michigan Technological University, University of Minnesota, IEEE, 2007.*

Yvan Lamelas Polo, Ying Wang, Ashish Pandharipande and Geert Leus, "Compressive Wide-band Spectrum Sensing", Delft University of Technology, Philips Research Europe, The Netherlands, IEEE, 2009.*

PCT International Search Report; Application No. PCT/US2011/039036; Oct. 11, 2011; 2 pages.

PCT Written Opinion of the International Searching Authority; Application No. PCT/US2011/039036; Oct. 11, 2011; 5 pages.

Soldani, David, et al.; "Wireless Relays for Broadband Access"; IEEE Communications Magazine; Mar. 2008; 9 pages.

\* cited by examiner $y$  $\Phi$  $g$

| 0.0 | 0.0 | 0.0 | 0.0 | 0.0 | 3.8 |
|-----|-----|-----|-----|-----|-----|
| 0.4 | -0.2 | 0.0 | 0.0 | 0.0 | 0.0 |
| 0.0 | 0.0 | 0.0 | 0.0 | 0.0 | -9.8 |
| 0.0 | 0.0 | -0.6 | 2.6 | 0.0 | 0.0 |
| 0.0 | 0.0 | 0.0 | 0.0 | 0.0 | 1.5 |
| 0.0 | 0.0 | 0.0 | 0.0 | 0.0 | -2.1 |
| 0.0 | 0.0 | -0.1 | 0.5 | 0.7 | 0.0 |
| -1.3 | 0.7 | 0.0 | 0.0 | 0.0 | 0.0 |

FIG. 7

FIG. 9
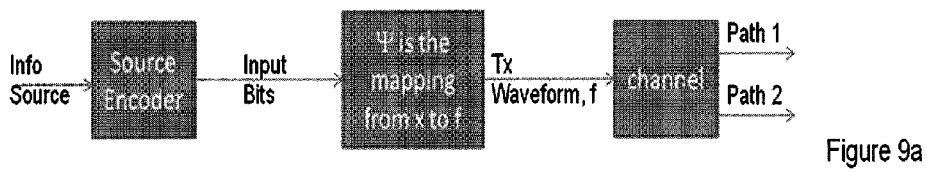
Figure 9a
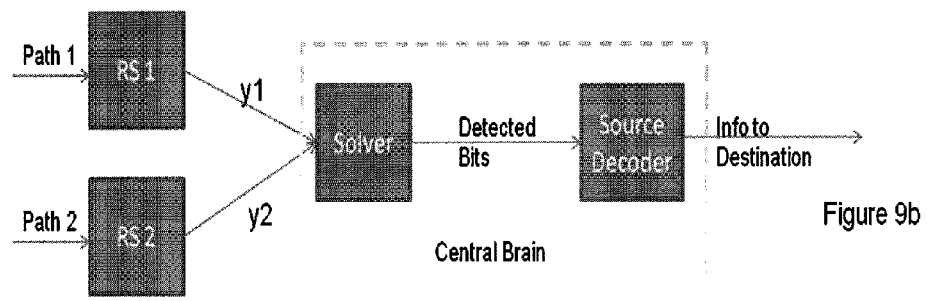
Figure 9b
Figure 9c
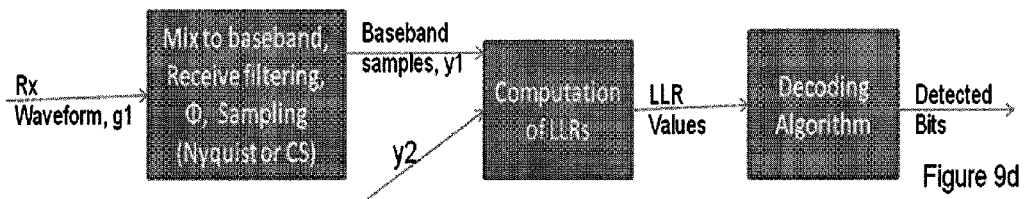
Figure 9d FIG. 10
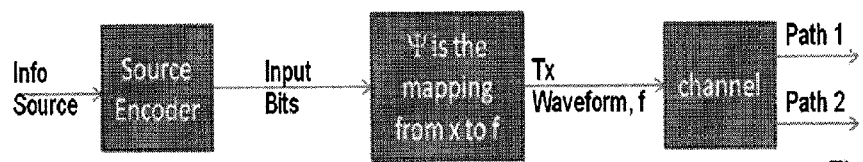
Figure 10a
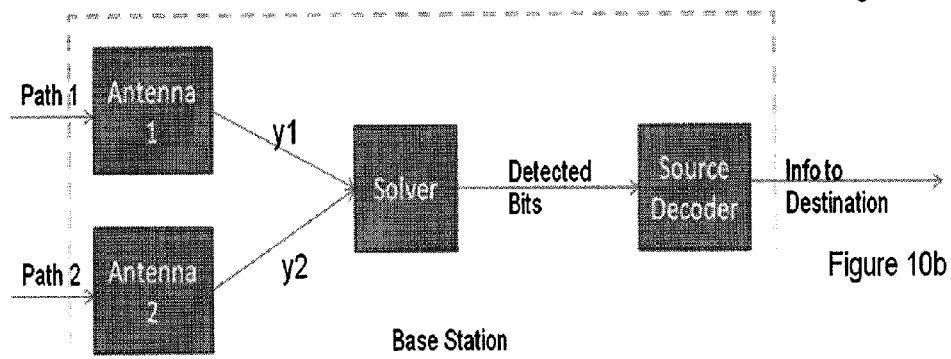
Figure 10b
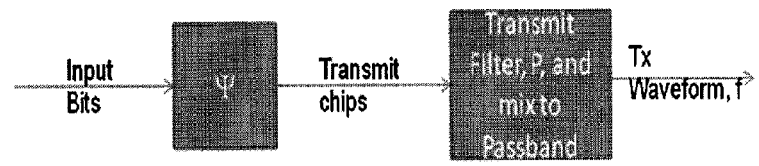
Figure 10c
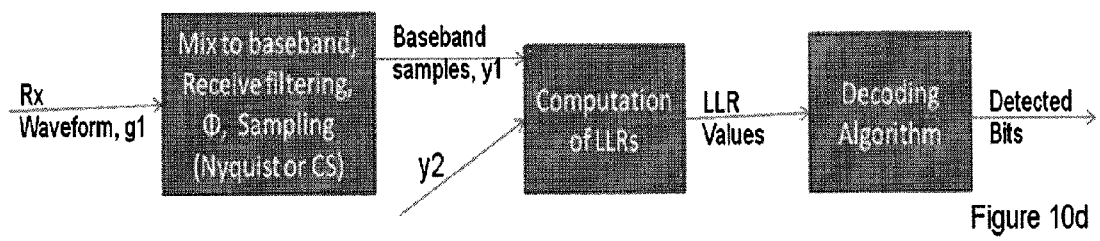
Figure 10d

MESSAGE DECODING FOR DISCRETIZED SIGNAL TRANSMISSIONS

CROSS-REFERENCE TO RELATED APPLICATIONS

This application is related to U.S. patent application Ser. No. 12/169,596 filed Dec. 10, 2009, entitled "SENSOR BASED WIRELESS COMMUNICATION SYSTEMS USING COMPRESSIVE SAMPLING." The foregoing application is incorporated herein by reference in its entirety.

FIELD

This disclosure generally relates to wireless communication systems and more particularly to methods, devices and systems for using compressive sampling in a sensor-based wireless communication system.

BACKGROUND

Wireless communications systems are widely deployed to provide, for example, a broad range of voice and data-related services. Typical wireless communications systems consist of multiple-access communication networks that allow users to share common network resources. Examples of these networks are time division multiple access ("TDMA") systems, code division multiple access ("CDMA") systems, single carrier frequency division multiple access ("SC-FDMA") systems, orthogonal frequency division multiple access ("OFDMA") systems, etc. or other like systems. An OFDMA system is supported by various technology standards such as evolved universal terrestrial radio access ("E-UTRA"), Wi-Fi, worldwide interoperability for microwave access ("WiMAX"), ultra mobile broadband ("UMB"), etc. and other similar systems. Further, the implementations of these systems are described by specifications developed by various standards bodies such as the third generation partnership project ("3GPP") and 3GPP2.

Communications between user equipment and base stations may be established using single-input, single-output systems ("SISO"), where only one antenna is used for both the receiver and transmitter; single-input, multiple-output systems ("SIMO"), where multiple antennas are used at the receiver and only one antenna is used at the transmitter; and multiple-input, multiple-output systems ("MIMO"), where multiple antennas are used at the receiver and transmitter. Compared to a SISO system, SIMO may provide increased coverage while MIMO systems may provide increased spectral efficiency and higher data throughput if the multiple transmit antennas, multiple receive antennas or both are utilized.

In many modern communication systems such as SIMO and MIMO, coding techniques are used to transmit signals from a user equipment or handset. However, these coding techniques add complexity to a wireless system and make recovery of a wireless transmission difficult at the receiver. Simplification of the coding and decoding techniques, while still maintaining robustness of signal transmission and security is therefore desired. Further, such simplification reduces the power necessary to operate these systems thus extending the life and/or increasing the range of such systems.

BRIEF DESCRIPTION OF THE DRAWINGS

To facilitate this disclosure being understood and put into practice by persons having ordinary skill in the art, reference is now made to exemplary embodiments as illustrated by reference to the accompanying figures. Like reference numbers refer to identical or functionally similar elements throughout the accompanying figures. The figures along with the detailed description are incorporated and form part of the specification and serve to further illustrate exemplary embodiments and explain various principles and advantages, in accordance with this disclosure, where:

FIG. 7 shows a constrained sensing matrix.

FIG. 9 shows an embodiment of the constrained matrix in a remote sampler—central brain architecture.

FIG. 10 shows the use of a constrained matrix in a network using base stations as opposed to remote samplers.

Figure 1:
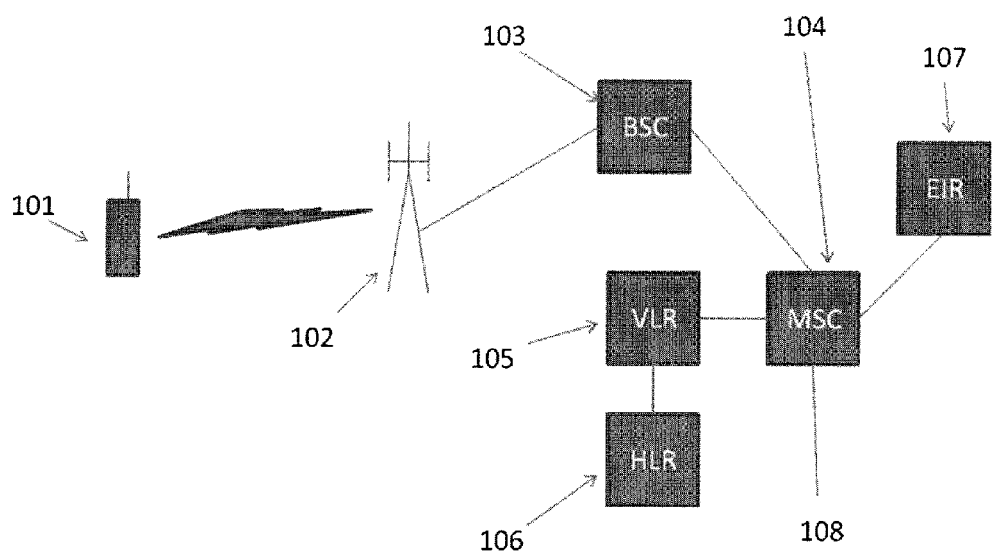
FIG. 1 show a conventional GSM network.

Skilled artisans will appreciate that elements in the accompanying figures are illustrated for clarity, simplicity and to further help improve understanding of the embodiments, and have not necessarily been drawn to scale.

DETAILED DESCRIPTION

Although the following discloses exemplary methods, devices and systems for use in sensor-based wireless communication systems, it will be understood by one of ordinary skill in the art that the teachings of this disclosure are in no way limited to the examplaries shown. On the contrary, it is contemplated that the teachings of this disclosure may be implemented in alternative configurations and environments. For example, although the exemplary methods, devices and systems described herein are described in conjunction with a configuration for aforementioned sensor-based wireless communication systems, the skilled artisan will readily recognize that the exemplary methods, devices and systems may be used in other systems and may be configured to correspond to such other systems as needed. Accordingly, while the following describes exemplary methods, devices and systems of use thereof, persons of ordinary skill in the art will appreciate that the disclosed examples are not the only way to implement such methods, devices and systems, and the drawings and descriptions should be regarded as illustrative in nature and not restrictive.

The techniques described herein can be used for various wireless communication systems. The aspects described herein are presented as methods, devices and systems that can include a number of components, elements, members, modules, nodes, peripherals, or the like. Further, these methods, devices and systems can include or not include additional components, elements, members, modules, nodes, peripherals, or the like. In addition, various aspects described herein can be implemented in hardware, firmware, software or any combination thereof. It is important to note that the terms "network" and "system" can be used interchangeably. Relational terms described herein such as "above" and "below", "left" and "right", "first" and "second", and the like may be used solely to distinguish one entity or action from another entity or action without necessarily requiring or implying any actual such relationship or order between such entities or actions. The term "or" is intended to mean an inclusive "or" rather than an exclusive "or." Further, the terms "a" and "an" are intended to mean one or more unless specified otherwise or clear from the context to be directed to a singular form.

Aspects of the current invention may be used in a variety of wireless networks. In describing aspects of the current invention, embodiments of the current invention will be described as pertaining to two different types of networks. One type of network, for example, is a GSM network currently deployed by a variety of wireless carriers. Other examples of this type of network are UMTS, WiMAX, UMB etc. The second type of network is a compressive sampling network described in a the related application "SENSOR BASED WIRELESS COMMUNICATION SYSTEMS USING COMPRESSIVE SAMPLING." However, aspects of the current invention are not limited to these networks and maybe used in other networks. In the following figures, FIGS. 1 to 6 describe networks and network elements, while FIGS. 7 to 10 describe embodiments of the current invention. One of ordinary skill in the art would easily recognize that the concepts and examples described herein can be extended to other networks and systems. Furthermore, the concepts and examples described herein may be executed on one processor or on a plurality of processors.

In describing the current invention, certain terms may be used interchangeably. With regards to a GSM network, a base station may be referred to as a node-B ("NodeB"), a base transceiver station ("BTS"), an access point ("AP"), a satellite, a router, or some other equivalent terminology. A base station may contain a RF transmitter, RF receiver or both coupled to a antenna to allow for communication with a user equipment. With regards to a compressive sampling network, a sensor may be referred to as a remote sampler, remote conversion device, remote sensor or other similar terms. A sensor may include, for instance, an antenna, a receiving element, a sampler, a controller, a memory and a transmitter. A sensor may be interfaced to, for instance, a base station. Further, sensors may be deployed in a wireless communication system that includes a core network, which may have access to another network.

In both networks, a user equipment used in a wireless communication system may be referred to as a mobile station ("MS"), a terminal, a cellular phone, a cellular handset, a personal digital assistant ("PDA"), a smartphone, a handheld computer, a desktop computer, a laptop computer, a tablet computer, a netbook, a printer, a set-top box, a television, a wireless appliance, or some other equivalent terminology. A user equipment may contain an RF transmitter, RF receiver or both coupled to an antenna to communicate with a base station. Further, a user equipment may be fixed or mobile and may have the ability to move through a wireless communication system. Further, uplink communication refers to communication from a user equipment to a base station, sensor or both. Downlink communication refers to communication from a base station, downlink transmitter or both to a user equipment.

A basic GSM system is shown in FIG. 1. 101 is a handset or user equipment (UE) in a GSM system. The UE in GSM are independent from networks-providers. The identity of the subscriber is obtained from a SIM (Subscriber Identity Module) that has to be inserted into the LIE to make it work. The SIM contains the IMSI (International Mobile Subscriber Identity) which identifies the subscriber to the network. It also contains information necessary to encrypt the connections on the radio interface. The UE itself is identified by an IMEI (International Mobile Equipment Identity), which can be obtained by the network upon request. 102, the Base Transceiver Station (BTS), communicates with the UEs. Usually, the BTS will have an antenna with several radio transceivers that communicate on a particular radio frequency. The link-level signalling on the radio-channels is interpreted in the BTS, whereas most of the higher-level signalling is forwarded to Base Station Controller (BSC) 103 and Mobile Switching Center (MSC) 104. The BSC 103 takes care of a number of different procedures regarding call setup, location update and handover for each UE 101. The BSC 103 decides when handovers between BTSs, such as 102, are necessary. The MSC 104 is a normal ISDN-switch with extended functionality to handle UEs such as 101. The basic function of MSC 104 is to switch speech and data connections between BSCs, other MSCs, other GSM-networks and external non-mobile-networks (referred to collectively as 108). The MSC also handles a number of functions associated with UEs, among others registration, location updating and handover. With each MSC, there is associated a Visitors Location Register (VLR) 105. The VLR 105 can be associated with one or several MSCs. The VLR 105 stores data about all customers who are roaming within the location area of that MSC. This data is updated with the location update procedure initiated from the MS through the MSC, or directly from the subscriber Home Location Register (HLR) 106. The HLR 106 is the home register of the subscriber. Subscription information, allowed services, authentication information and localization of the subscriber are at all times stored in the HLR. This information may be obtained by the VLR/MSC when necessary. When the subscriber roams into the location area of another VLR/MSC, the HLR is updated. The Equipment Identity Register (EIR) 107 is an optional register. The purpose of the ER is to register IMEIs of mobile stations in use.

Figure 2:
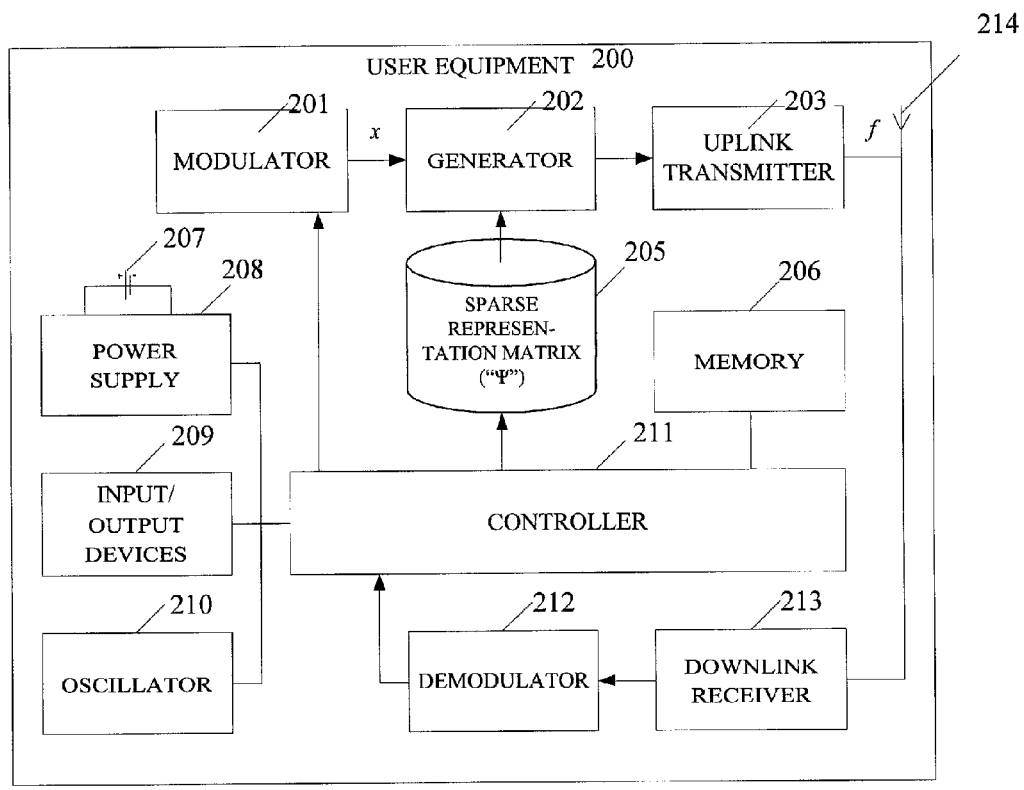
FIG. 2 illustrates a wireless device, which can be used in a sensor-based wireless communication system using compressive sampling.
Figure 3:
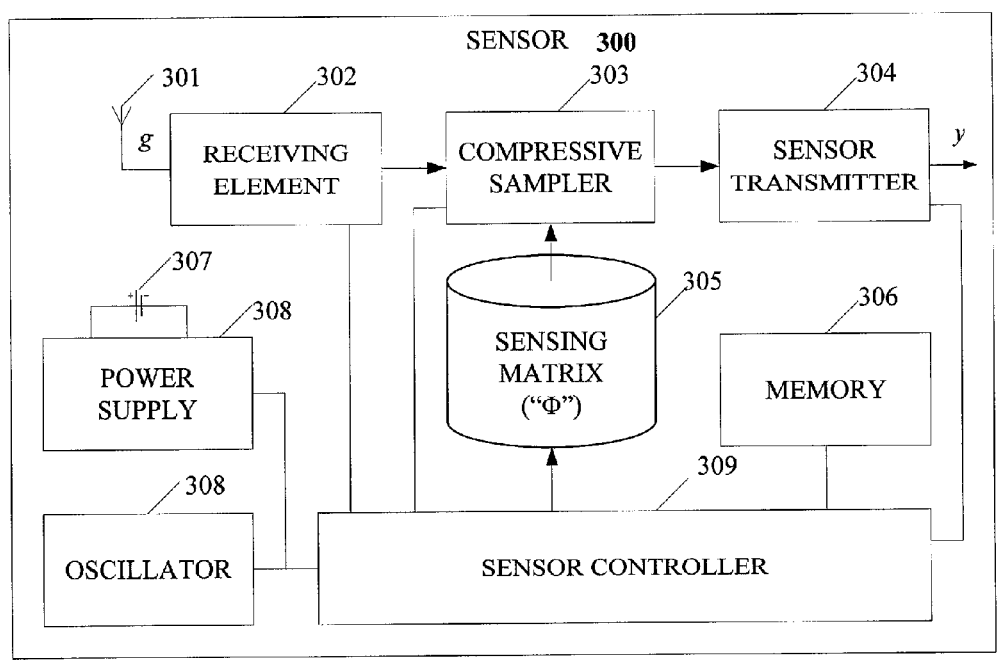
FIG. 3 illustrates a sensor, which can be used in a sensor-based wireless communication system using compressive sampling.
Figure 4:
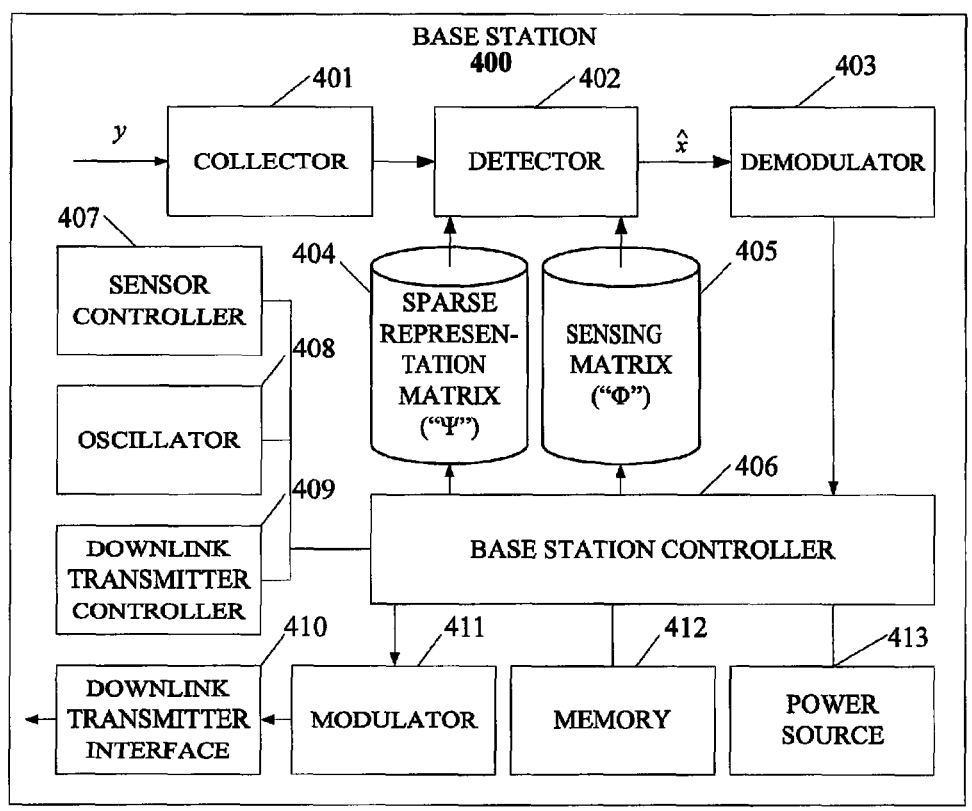
FIG. 4 illustrates a base station, which can be used in a sensor-based wireless communication system using compressive sampling.

FIGS. 2 to 4 show an example of components in a compressive sensing network. For further information regarding compressive sampling, please reference the related application "SENSOR BASED WIRELESS COMMUNICATION SYSTEMS USING COMPRESSIVE SAMPLING." FIG. 2 illustrates a user equipment 200, which can be used in sensor-based wireless communication system using compressive sampling. In FIG. 2, user equipment 200 can include modulator 201 for modulating an uplink message to form an information signal ("x"). Generator 202 can receive the information signal ("x") and can apply a sparse representation matrix ("$\Psi$") 205 to the information signal ("x") to generate an uplink signal ("f"), which is transmitted by uplink transmitter 203 using, for instance, antenna 214. User equipment 200 can also include a downlink receiver 213 for downconverting a downlink signal received by antenna 214. The received downlink signal can then be processed by demodulator 212 to generate a downlink message. User equipment 200 can include oscillator 210 for clocking user equipment 200 and maintaining system timing, power supply 208 such as battery 207 for powering user equipment 200, input/output devices 209 such as a keypad and display, memory 206 coupled to controller 211 for controlling the operation of user equipment 200, other elements or combination of elements. A person of ordinary skill in the art will recognize the typical elements found in a user equipment.

FIG. 3 illustrates a sensor 300, which can be used in sensor-based wireless communication system. In FIG. 3, a sensor can include receiving element 302 for downconverting an uplink signal ("f") received by, for instance, antenna 301. Compressive sampler 303 can apply a sensing matrix ("Φ") 305 to the uplink signal ("f") to generate a sensed signal ("y"), which can be sent using sensor transmitter 1232. Sensor 300 can include oscillator 308 for clocking sensor and maintaining system timing, power supply 308 such as battery 307 for powering sensor 300, memory 306 coupled to controller or state machine 309 for controlling the operation of sensor 300, other elements or combination of elements. Controller 309 may be implemented in hardware, software, firmware or any combination thereof. Further, controller 309 may include a microprocessor, digital signal processor, memory, state machine or any combination thereof.

FIG. 4 illustrates a base station 400, which can be used in a sensor-based wireless communication. In FIG. 4, in the uplink direction, base station 400 can include collector 401 for collecting sensed signal ("y"). Detector 402 can receive the collected sensed signal ("y") and can use a sensing matrix ("Φ") 405 and a sparse representation matrix ("Ψ") 404 to estimate and detect information signal ("x") from the collected sensed signal ("y"). Controller 406 may evaluate the detected information signal ("x^") to determine the uplink message. In the downlink direction, base station 400 can include a modulator 411 for modulating a downlink message and downlink transmitter interface 410 for sending the modulated downlink signals. Base station 400 can include oscillator 408 for clocking base station 400 and maintaining system timing, power supply 413 for powering base station 400, memory 412 coupled to controller 406 for controlling the operation of base station 400, sensor controller 309 for controlling a sensor, downlink transmitter controller for controlling a downlink transmitter, other elements or combination of elements.

Figure 5:
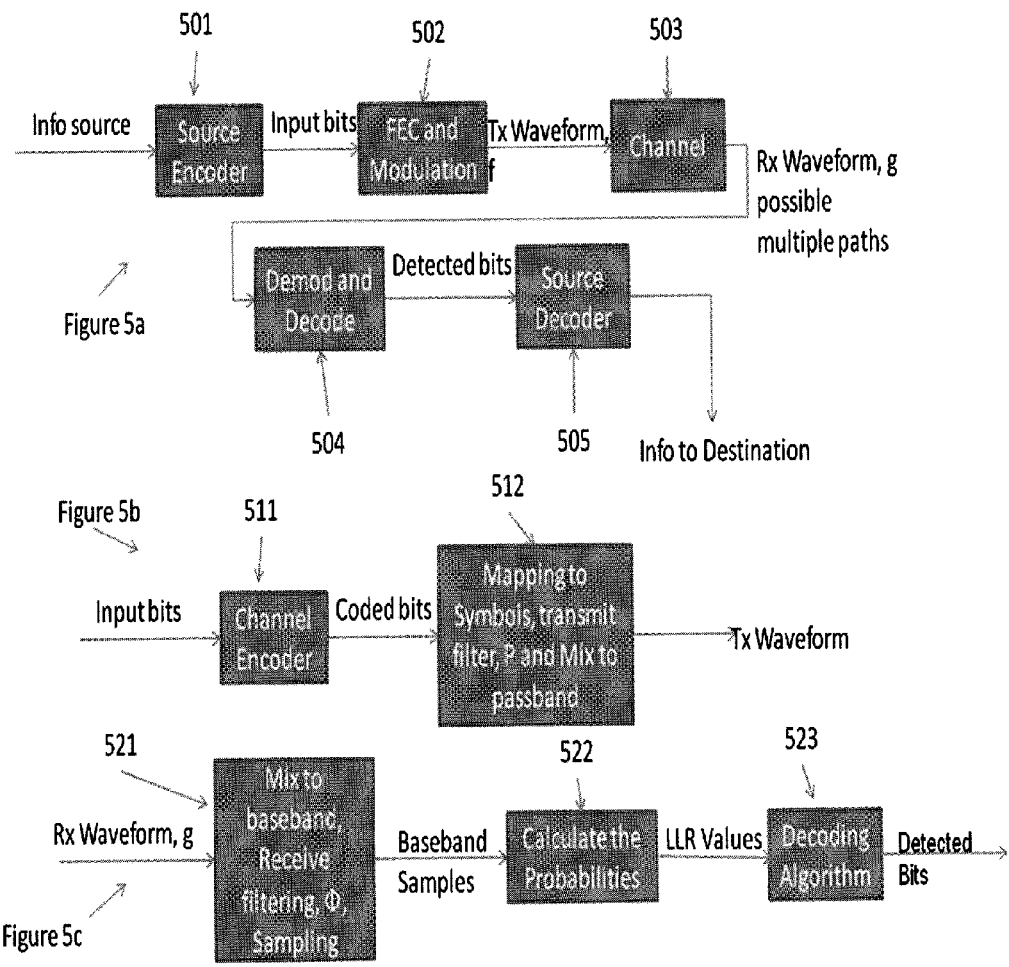
FIG. 5 illustrates a conventional radio communication scheme.

FIG. 5 shows a conventional radio communication scheme. To show correspondence with other drawings, the transmit signal has been denoted as "f" and the receive signal as "g," although the actual waveforms of "f" and "g" depend on the system being discussed. The principle of mapping followed by transmit filtering of 5b is known in the art. Examples of the Channel Encoder of FIG. 511 are Linear Block Codes and Trellis Codes, Turbo Codes, LDPC Codes and Fountain Codes. Example implementations of a channel coder include shift register circuitry and matrix multiplication where the encoder is represented by a generator matrix. An example of a Channel Encoder is a convolutional code shown at the top of FIG. 8. One of ordinary skill in the art will recognize that many other types of convolutional encoders are possible. Examples of the 523 Decoding Algorithm are the Viterbi Algorithm and the BCJR Algorithm. One of ordinary skill in the art will recognize that other types of Decoding Algorithms are also possible.

An example of the blocks of FIG. 5b for a commercial cellular system is well known to one of ordinary skill in the art. All of the blocks of FIGS. 5a, 5b and 5c are well known to one of ordinary skill in the art (although the precise labels of the signals are many or of a great variety).

Transforms are operations which represent a signal in a different way. Transforms can never increase the information in a signal. Digital signal processing represents signals by sequences of numbers, and transforms change a first sequence into a second sequence which is more desirable in some way. Perhaps the most well known example is a discrete Fourier transform. A time sequence of numbers is changed into a frequency sequence of numbers. The position of the peak in the latter sequence reveals where most of the energy of the time sequence is located in the frequency domain. For block-oriented processing, transforms can be represented as matrices operating on input vectors and producing output vectors.

An analog continuous-time waveform of finite bandwidth can be completely specified by samples taken at discrete moments in time. The minimum rate at which these samples can be taken is generally referred to as the Nyquist rate. Sampling at the Nyquist rate amounts to two samples per chip with the chip epoch is unknown, and one sample per chip when it is known.

The process of designing the "FEC and Modulation" of 502 is known as channel coding. The source encoder has provided a sequence of information bits. The task of the "FEC and Modulation" step is to create a waveform to transmit, that, when received ("Demod and decode" of FIG. 5a), can be associated uniquely with those information bits. For a given bandwidth and received signal to noise ratio, there is a maximum number of bits which can be received without error, known as the channel capacity.

The Viterbi and BCJR algorithms mentioned above are examples of the process of mapping the demodulator output obtained from the observed waveform, or waveforms, back to a decision of what the transmitted information bits were (FIGS. 5a and 520 "Detected Bits"). The computation of LLRs in FIG. 1c is a step needed to provide input to the decoding algorithm as discussed above.

Figure 6:
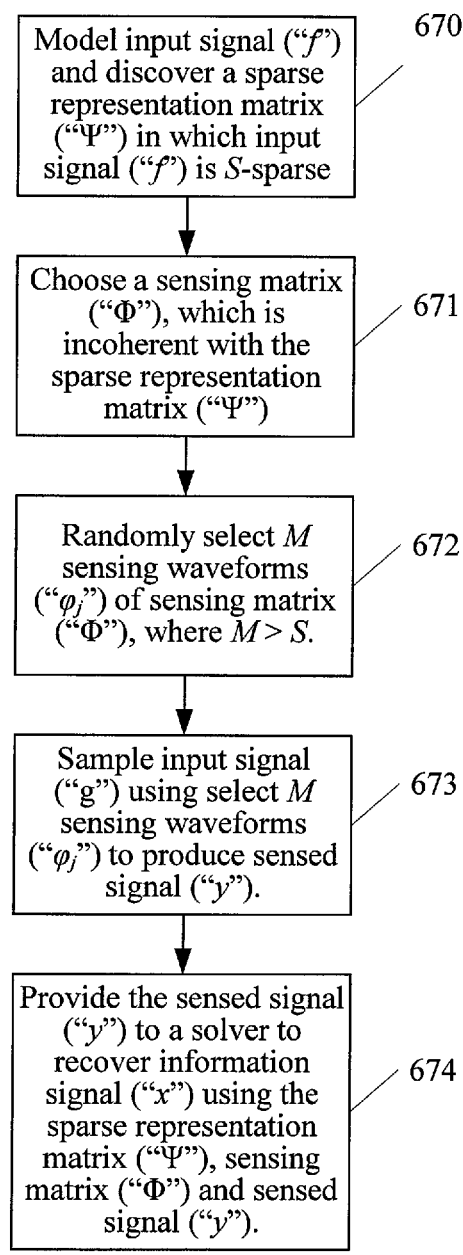
FIG. 6 is a flow chart of one method of a compressive sampling.

FIG. 6 is a flow chart of a compressive sampling method 600, which can be used, for instance, to design a compressive sampling system. In FIG. 6, method 600 can start at block 670, where method 600 can model an input signal ("f") and discover a sparse representation matrix ("Ψ") in which the input signal ("f") is S-sparse. At block 671, method 600 can choose a sensing matrix ("Φ"), which is sufficiently incoherent with the sparse representation matrix ("Ψ"). At block 672, method 600 can randomly, deterministically or both select M sensing waveforms ("φj") of sensing matrix ("Φ"), where M may be greater than or equal to S. At block 673, method 500 can sample input signal ("f") using the selected M sensing waveforms ("φj") to produce a sensed signal ("y"). At block 674, method 600 can pass the sparse representation matrix ("Ψ"), the sensing matrix ("Φ") and the sensed signal ("y") to a detector to recover an information signal ("x").

FIG. 7 represents an embodiment of the current invention. FIG. 7 shows a constrained sensing matrix. The constrained sensing matrix is not an identity matrix, rather, the constrained sensing matrix has a limited number of non zero values, which are all not equal to one, in each row in addition to several zero values. The constrained matrix may be used in many different wireless transmission techniques to produce a set of samples. From this set of samples, probability techniques such as log likelihood ration (LLR) may be easily used to choose one of the set of samples due to the limited number of non-zeros values. This process can be further simplified by further constraining non-zero values on a row of the sensing matrix to either occupy the same columns as non-zero values on another row or be wholly disjoint. The sample is then decoded using decoding techniques such as a trellis decoder.

While a constrained matrix may be used ideally with a compressive sampling system as described in this application, the constrained matrices may also be used in other wireless communication networks which utilize decoding and probability to reduce system complexity while retaining robustness. In the context of compressive sampling, the constrained matrix may be used at either the remote sampler or the remote central server to transform a message sent by a user equipment. The probability technique may be performed at a remote sampler in the case of a compressed sensing network, or at a base station in other types of networks.

Figure 8:
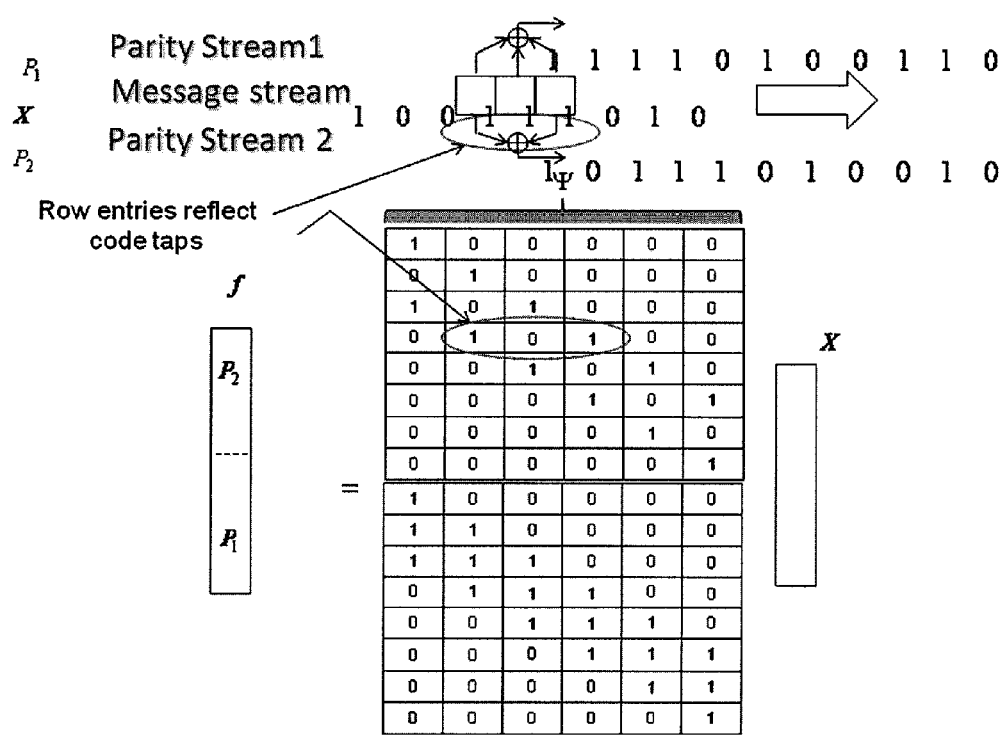
FIG. 8 shows a generator matrix used as a representation matrix.

FIG. 8 represents an embodiment of the current invention. FIG. 8 shows a generator matrix used as a representation matrix. Generator matrices are well known in coding techniques as a form of forward error control. Such a generator matrix could be used to allow a receiver to detect and correct errors in the transmission without requiring the transmitting node to resend the data. This provides the advantage that additional channels are not required to resend data to the receiver. The implementation of such a generator matrix is a form of encoding of a convolution code. The generator matrix would be used in the context of compressive sampling to encode a signal. The signal would be multiplied by the generator code to form a series of codewords. These codewords would then be transmitted by the handset to a remote sampler or a base station depending on the implementation.

It will be appreciated by those skilled in the art that the generator matrix may be generated at any number of components attached to the network, however, the matrix would need to be transmitted to the user equipment or handset in order for the generator matrix to be used. Alternatively, the generator matrix may be hard coded into the user equipment or handset, or the user equipment or handset may be able to create the generator matrix itself. Furthermore, in certain networks involving a plurality of handsets, a single component, or multiple components may create the generator matrix and the same or other components may transmit the generator matrix to the user equipment or handsets. The same or different generator matrices may be used by one, some or all of the user equipment or handsets in a network.

FIG. 9 contains FIGS. 9a, 9b, 9c and 9d showing an embodiment of the constrained matrix in a remote sampler—central brain architecture. FIGS. 9a and 9b depicting the remote sampler—central brain architecture (for more details, please see the December 2009 nonprovisional filing of T. Sexton and J. Womack, or the April 2010 nonprovisional filing of P. Lusina, T. Sexton, S. Simmons, and J. Womack). Diagram 2c shows transmit operations in more detail. In order to gain the benefit of an FEC (forward error correction) structure, the $\Psi$ matrix may be taken to be a generator matrix. The sampling may be Compressive Sampling.

FIG. 10 contains FIGS. 10a, 10b, 10c and 10d. These diagrams show the use of a constrained matrix in a network using base stations as opposed to remote samplers.

Having shown and described exemplary embodiments, further adaptations of the methods, devices and systems described herein may be accomplished by appropriate modifications by one of ordinary skill in the art without departing from the scope of the present disclosure. Several of such potential modifications have been mentioned, and others will be apparent to those skilled in the art. For instance, the exemplars, embodiments, and the like discussed above are illustrative and are not necessarily required. Accordingly, the scope of the present disclosure should be considered in terms of the following claims and is understood not to be limited to the details of structure, operation and function shown and described in the specification and drawings.

As set forth above, the described disclosure includes the aspects set forth below.

What is claimed is:

1. A method of receiving signals, said method comprising:
   receiving a transmission from a user equipment said user equipment transmission being formed from forward error correction on data bits;
   sensing said transmission using a constrained sensing matrix to create a first set of samples, wherein the sensing matrix has a number of non-zero values in each row in addition to a plurality of zero values, the absolute values of said non-zero values do not equal to one;
   downsampling said first set of samples to a second set of samples to create a compressively sampled signal, said second set of samples being fewer in number than the first set of samples; and
   decoding the user equipment transmission.

2. The method of claim 1 wherein said compressively sampled signal is output to a FEC decoder.

3. A method of wireless communication, said method comprising:
   receiving, at one of a base station and a remote sensor, over a wireless channel, a transmission from a user equipment;
   down converting and discretizing the received transmission to create a discretized signal;
   and correlating the discretized signal with a constrained matrix to produce a set of samples; wherein each row of the constrained matrix is limited to zero values and at least one non-zero value, each non-zero value being greater than or less than one; said constrained matrix is not an identity matrix or a sparse matrix;
   performing a probability calculation on the set of samples to transform the set of samples.

4. The method of claim 3 further comprising:
   performing a decoder algorithm on the transformed one of the set of samples.

5. The method of claim 3 wherein the probability calculation is a log likelihood ration (LLR).

6. The method of claim 3 wherein said non-zero values in adjacent rows of the constrained matrix formed by a set of vectors are in different columns.

7. The method of claim 4 wherein the decoder algorithm uses a trellis representation of encoder operation.

8. The method of claim 3 wherein the set of samples is sent to a remote central server.

9. The method of claim 3 wherein said correlating and discretizing is performed at a remote sampler.

10. The method of claim 3 wherein said correlating and discretizing is performed at a base station.

11. The method of claim 3 wherein said probability calculation is performed at a remote central server.

12. The method of claim 3 wherein said probability calculation is performed at a remote sampler.

13. The method of claim 3 wherein said probability calculation is performed at a base station.

14. The method of claim 3 wherein said correlating and discretizing is performed at a remote central server.

15. The method of claim 4 wherein said performing a decoder algorithm is performed at a remote central server.

16. An apparatus for receiving wireless communication, said apparatus comprising:
   one of a base station and a remote sensor; and
   a processor configured to:
      receive a transmission signal from a user equipment based on a combination of vectors;
      down convert and discretize the received signal to produce a discretized signal;
      correlate the discretized signal using a constrained matrix to produce a set of samples, wherein each row of the constrained matrix is limited to zero values and at least one non-zero value, each non-zero value being greater than or less than one; and
      perform a probability calculation on the set of samples to select one of the set of samples.

17. The apparatus of claim 16 wherein said processor is configured to perform a decoder algorithm.

18. The apparatus of claim 16, wherein the constrained matrix is not an identity matrix or trivial sparse matrix.

19. The apparatus of claim 16, wherein non-zero values on rows adjacent to one another are located in different columns of the constrained matrix.

20. The apparatus of claim 16, wherein non-zero values on one row of the constrained matrix occupy same columns as non-zero values on another row.

\* \* \* \* \*